United States Patent [19]

Kawaguchi et al.

[11] Patent Number: 5,071,605
[45] Date of Patent: Dec. 10, 1991

[54] METHOD FOR PRODUCING FOAM MOLD

[75] Inventors: Hiroshi Kawaguchi; Masaaki Sugiura; Hisashi Kurita, all of Anjyo, Japan

[73] Assignee: Inoue MTP Kabushiki Kaisha, Nagoya, Japan

[21] Appl. No.: 524,614

[22] Filed: May 17, 1990

[30] Foreign Application Priority Data

Sep. 26, 1989 [JP] Japan .................... 1-249757

[51] Int. Cl.⁵ .............................. B29C 67/22
[52] U.S. Cl. .................... 264/45.2; 264/46.5; 264/276
[58] Field of Search ............ 264/276, 46.4, 46.5, 264/46.6, 46.7, 45.2

[56] References Cited

U.S. PATENT DOCUMENTS

| | | | |
|---|---|---|---|
| 4,420,447 | 12/1983 | Nakashima | 264/46.7 |
| 4,814,036 | 3/1989 | Hatch | 264/276 |
| 4,923,653 | 5/1990 | Matsuura et al. | 264/40.3 |
| 4,959,184 | 9/1990 | Akai et al. | 264/46.6 |
| 4,976,414 | 12/1990 | Yanagishita | 264/46.6 |

FOREIGN PATENT DOCUMENTS

| | | | |
|---|---|---|---|
| 60-49905 | 5/1986 | Japan | 264/46.6 |
| 61-125816 | 6/1986 | Japan | 264/46.4 |
| 62-82010 | 4/1987 | Japan | 264/46.4 |

Primary Examiner—Robert A. Dawson
Assistant Examiner—Allan R. Kuhns
Attorney, Agent, or Firm—Armstrong, Nikaido, Marmelstein, Kubovcik & Murray

[57] ABSTRACT

A method for manufacturing a foam product in which a skin material and a core material having at least one opening are set on upper molding die and lower molding die, respectively, and a foaming resin material is then poured between the skin material and the core material to integrally mold them. A recess is formed on the portion of the upper molding die that corresponds to the opening of the core material. The opening of the core material is covered by an air permeable seal member adhered to the core material. The foaming resin material is then poured in a cavity defined between the molding dies.

3 Claims, 4 Drawing Sheets

METHOD FOR PRODUCING FOAM MOLD

BACKGROUND OF THE INVENTION

1. Field of the Invention

The present invention relates to a method for producing a foam mold, and more precisely, it relates to an improved method for producing a foam product, in which a core material having an opening is set in a molding die, so that a foaming resin material is poured therein to produce a foam mold.

2. Description of Related Art

For instance, interior mold products, such as instrument panel, arm rest, knee protector, door panel etc. in an automobile are made of a skin material and a predetermined shape of core material, which are set in a molding die, so that a foaming agent, such as a polyurethane resin is poured therein to produce a foam product (mold).

Such foam products usually have complex shapes and different sizes of openings, depending on the functions thereof and in connection with elements associated therewith.

Upon molding, as shown in FIG. 5, the foaming material enters the back side of the core material 10 through the opening 11 thereof, so that the foaming material remains therein to form a burr or flash applied to a product or a molding surface of the molding die. The burr or flash damages both the molding die and the products, and sometimes causes a problem by the occurrence of a defect or a cavity in the products. In FIG. 5, numeral 19 designates a skin of a product, 41 a lower molding die, 42 an upper molding die, and 43 a cavity, respectively.

To eliminate these drawbacks, the inventors of the present invention tried to provide an improved foaming process in which a predetermined shape of seal member 15 made of a slab of polyurethane foam is first adhered to the core material 10 to cover the opening 11 therein, and then the foaming resin material is poured in the molding die, as shown in FIG. 6. Since the seal member 15 which is made of a slab of polyurethane foam has air permeability, the gas which is produced during foaming and any air remaining in the molding die permeate through the seal member 15. However, the inventors found that the pressure of the foaming resin material during foaming caused the foaming material to pass through the sealing member 15 and the opening 11 of the core material 10, so that the foaming material entered the back side of the core material 10 anyway and penetrated into the upper molding die 42. This is because no counter pressure is applied to the lower molding die 41 from the upper molding die at the opening 11 of the core material 10.

SUMMARY OF THE INVENTION

The primary object of the present invention is to provide a new foam molding method in which an air permeable seal member is effectively used to discharge a foaming gas and any residual gas therethrough from a molding die without producing a burr at an edge of an opening of a core material.

To achieve the object mentioned above, according to the present invention, there is provided a method for manufacturing a foam product in which a skin material and a core material with an opening are set on an upper molding die and a lower molding die, respectively, and a foaming resin material is then poured between the skin material and the core material to integrally mold them, wherein a recess is formed on the portion of the upper molding die that corresponds to the opening of the core material, and the opening of the core material is covered by an air permeable seal member adhered to the core material, and then the foaming resin material is poured in a cavity defined between the molding dies.

With the features of the present invention, as mentioned above, the upper die has a recess corresponding to the opening of the core material, and the opening of the core material is covered by the air permeable seal member. The foaming pressure of the resin material which is produced during foaming acts on the inside of the seal member which covers the opening of the core material. When the seal member receives the foaming pressure, the seal member elastically deforms or bulges into the recess formed in the upper molding die. Due to the deformation of the seal member into the recess of the upper molding die, the internal pressure of the recess, which is slightly increased by residual air permeating the seal member and the foaming gas produced during the foaming of the foaming material when the expansion of the foaming material takes place, is substantially increased. The increased internal pressure of the recess effectively prevents the foaming material from penetrating into the seal member, thus resulting in no occurrence of a burr or flash at the edge of the opening of the core material.

BRIEF DESCRIPTION OF THE DRAWINGS

The invention will be described below in detail with reference to the accompanying drawings, in which.

DESCRIPTION OF PREFERRED EMBODIMENTS

FIGS. 1–4 show an embodiment of the present invention.

Figure 1:
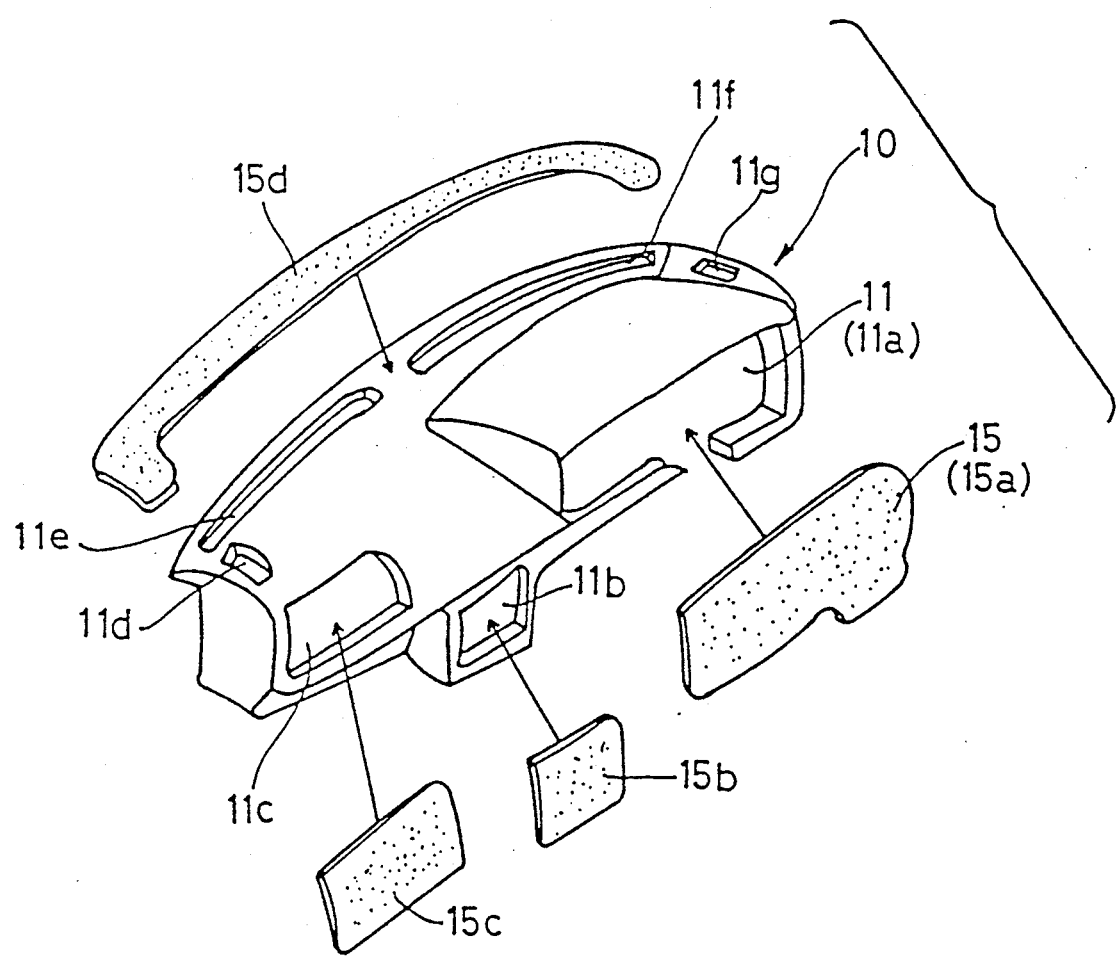
FIG. 1 is a perspective view of a core material for an instrument panel of an automobile and seal members which cover the openings of the core material, according to an aspect of the present invention.

As shown in FIG. 1, the core material 10 for an instrument panel of an automobile is made of an injection mold of a relatively hard synthetic resin and has openings 11a, 11b and 11c for instrument window, ash tray and glove compartment, respectively. The core material 10 also has air blowing openings 11d, 11e, 11f and 11g etc. These openings are represented by an opening 11.

The openings 11a, 11b and 11c are covered by respective seal members 15 (15a, 15b and 15c) corresponding thereto, which are adhered in advance to the core member 10. The openings 11d, 11e, 11f and 11g are covered by a common single seal member 15d.

FIG. 2 shows different steps of a manufacturing process according to the present invention. The seal member 15 is made of an air permeable foam material, and preferably a slab sheet of polyurethane foam. In the illustrated embodiment, the slab sheet of polyurethane foam of which the seal member 15 is made has an open cell structure and has 200% of elongation, 20-50 of foaming ratio and 2-4 mm of thickness.

Figure 2A:
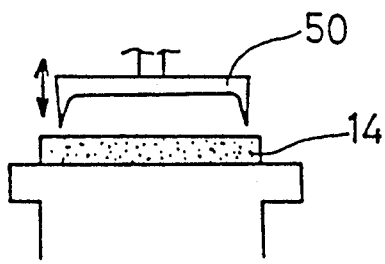
FIG. 2(A-E) is a schematic view showing different processes of fomation and application of a seal member.
Figure 2B:
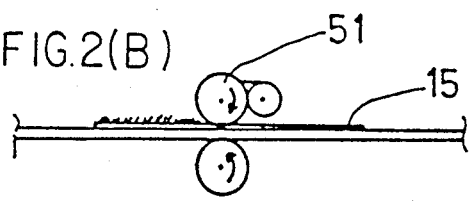
Figure 2C:
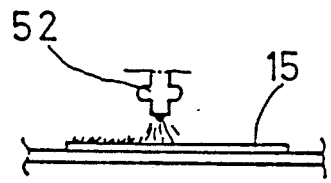
Figure 2D:
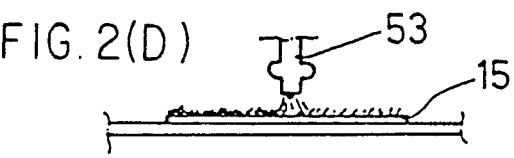
Figure 2E:
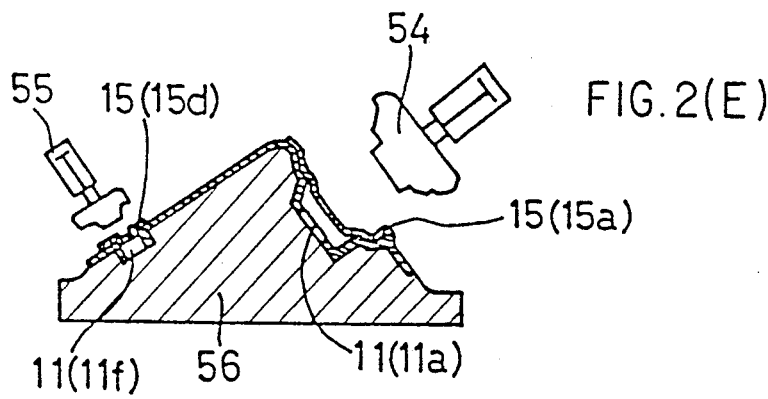

The slab sheet of base material 14 is first cut into a predetermined shape by a punching blade or a cutter blade 50 having a shape corresponding to the shape of the associated opening of the core to form a seal member 15, as shown in FIG. 2(A). The punching blade 50 which is exchangeable is replaced with another blade, depending on the shape of the seal member 15. After that, an adhesive of prepolymer is applied to one side face of the seal member 15 by a roll coater 51 as shown in FIG. 2(B), or a spray 52 as shown in FIG. 2(C). After that, to accelerate the reaction of adhesion of the prepolymer, catalyzer and water are applied to the seal member 15, as shown at 53 in FIG. 2(D). The seal member 15 is then pressed down onto the edge of the associated opening 11 of the core material to cover the opening 11, so that the seal member 15 (15a, 15d, etc.) is adhered to the edge of the associated opening 11 (11a, 11f, etc.), as shown in FIG. 2(E). In the adhering step of the seal member 15 shown in FIG. 2(E), the core material 10 is heated to about 60° C., so that the seal members 15a, 15d etc. can be thermally adhered to the edges of the associated openings 11a, 11f etc. of the core material by using press dies 54 and 55 which are heated to about 80° C. Numeral 56 in FIG. 2(E) designates a holder which holds the core material 10.

Figure 3:
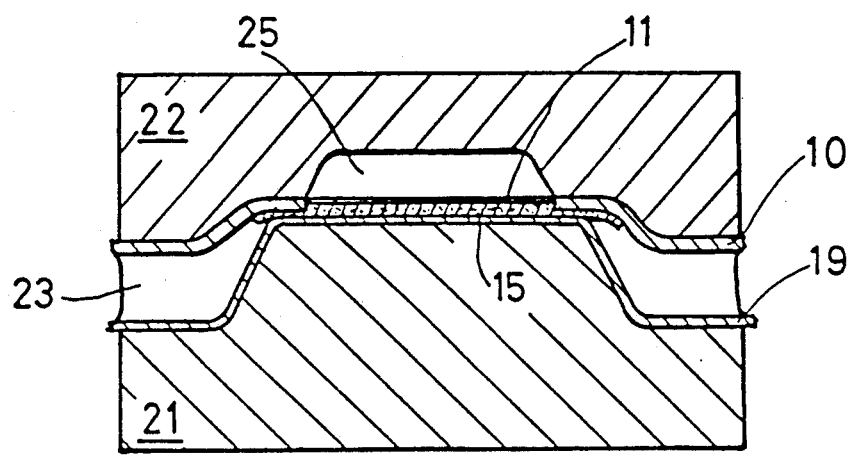
FIG. 3 is an enlarged sectional view of a main part of molding dies before a foaming material is molded.

FIG. 3 shows a core material 10 which has seal member(s) 15 adhered thereto to cover the associated openings(s) 11, as mentioned before is set on the molding surface of the lower molding die 22. Similarly, a skin material 19 is set on the molding surface of the lower molding die 21. Numeral 23 designates a molding cavity.

According to the present invention, the upper molding die 22 has recess(es) 25 corresponding to the associated openings 11 of the core material 10, which will be discussed hereinafter.

Figure 4:
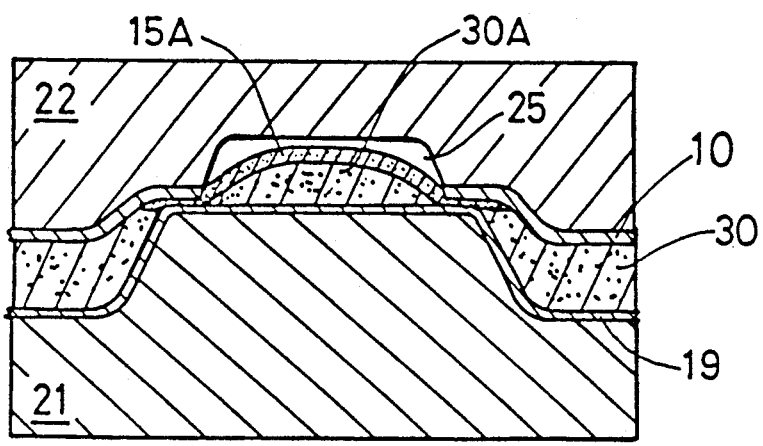
FIG. 4 is an enlarged sectional view of a main part of molding dies during foaming of a foaming material.
Figure 5:
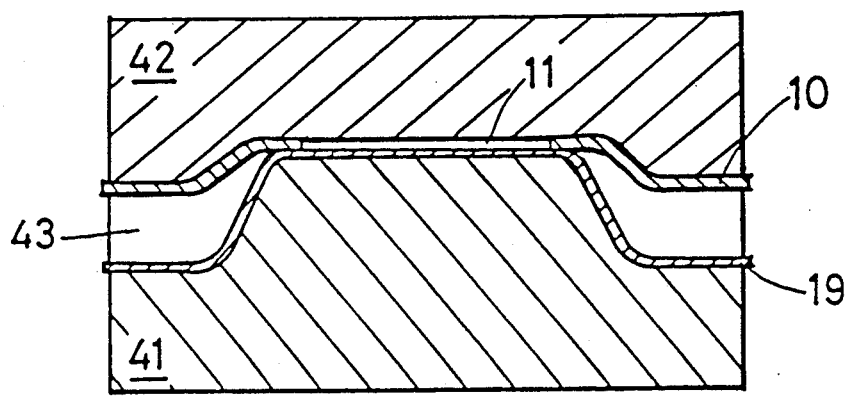
FIG. 5 is a partial sectional view of conventional molding dies.
Figure 6:
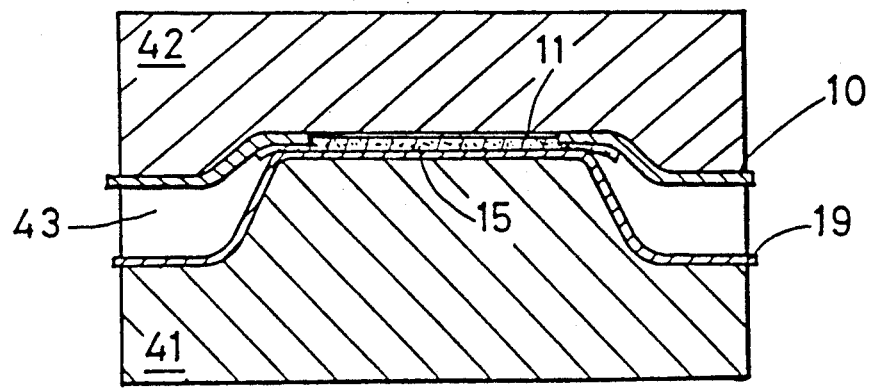
FIG. 6 is a view similar to FIG. 5, but showing an improved molding process, according to prior art.

After that, as shown in FIG. 4, a foaming resin material 30, such as polyurethane is poured in the molding cavity 23 defined by the upper and lower molding dies 22 and 21 to mold a foam.

As mentioned before, during foaming, a volume expansion of the foaming material 30 due to foaming thereof takes place, so that the residual air and the foaming gas in the cavity 23 is forced out therefrom through the seal member 15. Consequently, due to the foaming pressure of the foaming material, a part 30A (FIG. 4) of the foaming material 30 enters the inside of the seal member 15A which covers the opening 11 of the core material 10. However, in the present invention, since the recess(es) 25 is (are) formed in the upper die 22, correspondingly to the opening(s) 11, the seal member 15A elastically deforms or bulges into the associated recess 25 due to the elasticity thereof. The deformation of the seal member 15A into the recess 25 increases the internal pressure of the recess 25. The deformation of the seal member 15A into the recess 25 and the increased internal pressure in the recess 25A prevent the foaming material from penetrating or permeating the seal member 15A. Thus, no burr or flash occurs at the edge of the opening 11.

Upon completion of molding, the deformed or bulged portion of the foaming material in the recess 25 can be removed together with the skin material.

As can be seen from the foregoing, according to the present invention, no burr occurs at the edge of the opening of the core material, and accordingly, no troublesome operation of the removal of the burr or flash is necessary after the completion of the molding.

Furthermore, no wiping operation for removing a release agent applied to the molding surfaces therefrom with the help of a solvent is necessary, thus resulting in an increased efficiency of molding.

We claim:

1. A method of manufacturing an integrally molded foam product, comprising a core material having at least one opening therein, a skin material and a foamed resinous material therebetween, which method comprises: disposing said skin material on a lower molding die; disposing said core material on an upper molding die having a gas containing recess corresponding to said opening in said core material; adhering a gas permeable seal member over said opening in said core material disposed on the side thereof away from said upper molding die; whereby defining a cavity between said core and said skin materials; disposing a foamable resin material in said cavity; and causing said foamable resin material to foam; whereby elastically deforming said seal member through said opening in said core material into said recess in said upper die, which deformation increases gas pressure in said recess, which increase in gas pressure in said recess substantially prevents foaming resin from penetrating through said seal member into said recess, and thereby substantially prevents the occurrence of a flash of foamed resin material from forming; and whereby joining said resin, said skin and said core into an integral molded product.

2. A method according to claim 1, wherein said seal member is made of a slab sheet of polyurethane.

3. A method according to claim 1, wherein the seal member bulges into the associated recess when the foaming resin material foams.

* * * * *